3,531,744

SUPERCONDUCTING DIRECT-CURRENT COIL

Wilhelm Kafka, Tennenlohe, Germany, assignor to Siemens Aktiengesellschaft, a corporation of Germany Filed Mar. 5, 1969, Ser. No. 804,453
Claims priority, application Germany, Mar. 6, 1968, 1,639,421
Int. Cl. H01f 7/22
U.S. Cl. 335—216 6 Claims

ABSTRACT OF THE DISCLOSURE

Superconductive direct-current disc coil includes at least two serially connected disc windings, each of the windings being formed of a winding band having a plurality of superconductive filamentary cores embedded therein and extending lengthwise of the band, the cores being spaced and insulated from one another and being connected in parallel at the ends of the band, respective pairs of the cores and the connections thereof forming a main loop, each of the main loops being intertwisted so as to be subdivided into component loops so that production of radial flux in the main loop is substantially avoided and peripheral voltages in the component loops substantially cancel one another during application and removal of excitation from the coil.

My invention relates to a superconducting direct-current disc coil having a high field intensity and formed with at least two disc coils connected in series in whose winding band are embedded superconducting cores separated from each other and connected in parallel at least at the coil ends.

In superconducting magnetic windings which store high amounts of energy, it is advantageous to restrict the number of turns in order to limit the voltage which occurs during the cutoff of the stored energy to external resistances, as for example, when a transition occurs. This produces excitation currents of several thousands of amperes. The conductors for such high currents are wide bands of metal having relatively good conductivity either provided with a thin layer of a hard superconductor or connected with a plurality of thin superconducting wires (cores) which are all connected in parallel. The metal band having relatively good conductivity serves as a stabilizing conductor during flux jumps or discontinuities in the superconductor. In order to obtain large cooling surfaces, the band is expediently made wide and thin.

A coil constructed in this manner has severe disadvantages, however; for example, when applying excitation considerable losses occur due to the penetration of the magnetic field into the wide and thin superconducting layer or into the superconducting loops formed by the parallel-connected single wires, as the case may be. Consequently, a considerable quantity of coolant such as helium, for example, becomes evaporated and is expended during the initiation and removal of the excitation. Another disadvantage is that the magnetic field intensity and the field distribution of a winding so constructed changes over a period of days and weeks after a constant excitation current has been established. It is therefore virtually impossible to set in constant field intensities at various points within a large volume for long periods of time. This is very disadvantageous, for example, in bubble chambers where the field distribution in the useful space should not change for long periods.

Coils have been constructed of intertwisted, multicore cables in which the cores are not insulated from one another. The cores were either disposed in the normal-conducting metal band or were fused together by means of a soft solder. The aforementioned difficulties are especially severe during the initiation and removal of excitation, when these coils are large and have a virtually unreduced diameter.

It is therefore an object of my invention to minimize the disturbing effects of the radial field of the coil which occurs during the application of excitation to and the removal thereof from large coils in such a way that virtually no radial magnetic flux occurs in the loops formed respectively of two cores and their junctions.

With the foregoing and other objects in view, I provide according to a feature of my invention cores that are filamentary and insulated from one another. Furthermore, each loop is defined by two cores and their mutual junctions and is subdivided into component loops by interchanging or intertwisting the cores so that virtually no radial flux occurs in the complete loop, and the peripheral or loop voltages in the component loops substantially cancel each other.

According to a further feature of my invention, the superconducting cores of the band in a coil having two coil halves disposed symmetrically with respect to a radial plane are insulated from one another at the plane of symmetry between the coil halves and extend to the next coil half without interchange or intertwist. It is preferable to use the so-called double-disc winding. For a coil assembled of component double coils with a respective double disc-winding it is advantageous according to my invention to provide between adjacent component double coils, at least in one part of each coil-half, interchanges or crossings of the cores. A high degree of perfection is achieved with the coil according to the invention by constructing the band in the form of a Roebel rod or crossing rod so that the interchanges or intertwists of the cores within the band continually repeat periodically across the entire band length. Thus, at least one interchange or intertwist can be provided for example on one winding periphery.

According to still another feature of the invention, the entire coil may be subdivided into two or more even-numbered component windings having a symmetrical field pattern. The mutually insulated cores of a band, which cores can for example be about 100 in number, are interchanged or intertwisted at the junctions of the component windings so that no flux passes through any individual loop of the entire coil. More specifically, the fluxes have an opposite direction in the component windings with respect to the entire loop. The cores are connected in parallel either within the cryostat of the coil or outside the cryostat at room temperature.

The interchanging or intertwisting of the individual cores are also provided, in accordance with a further feature of my invention, for relatively short conductor lengths, in the form of a Roebel rod. The pitch length of the twist or more specifically, the distance from one to the next point of interchange or crossing between two cores can be selected to have a magnitude of about one meter. In a coil having a conductor length of one km., each core then assumes the same position with respect to the magnetic field and as a result no loop is traversed by any significant magnetic field.

Other features which are considered as characteristic for the invention are set forth in the appended claims.

Although the invention is illustrated and described herein as embodied in superconducting direct-current coil, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figures 1, 2:
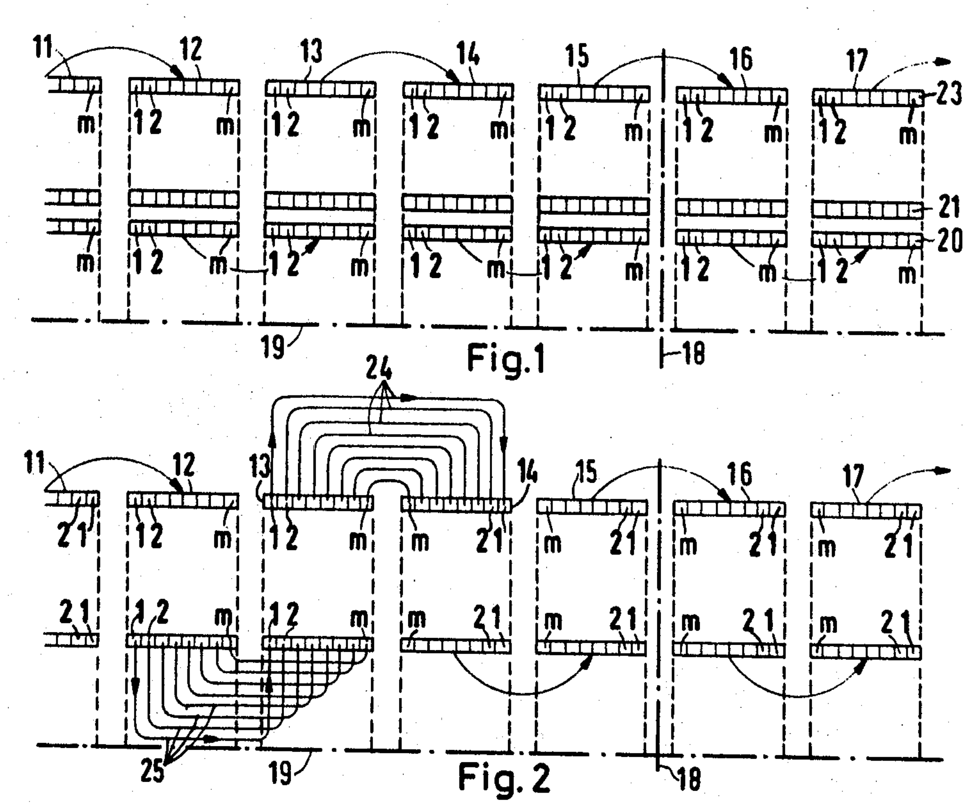
FIG. 1 is a diagrammatic view of the middle portion of a coil with a plurality of simple disc-type windings.
FIG. 2 is a diagrammatic view of the middle portion of a coil with a plurality of double disc windings.
Figure 3A:
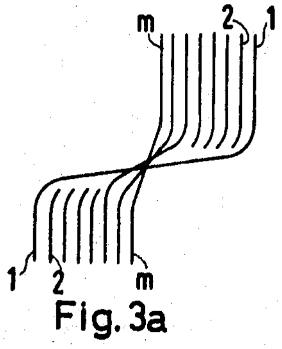
Figure 3B:
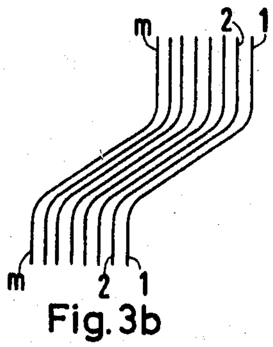
Figure 4A:
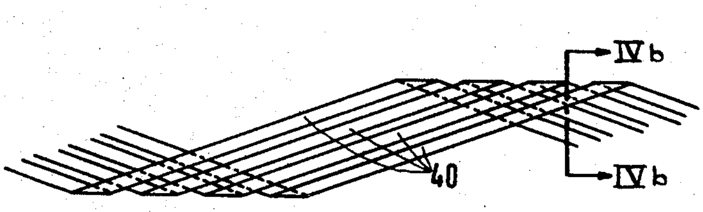
Figure 4B:
Figure 5:
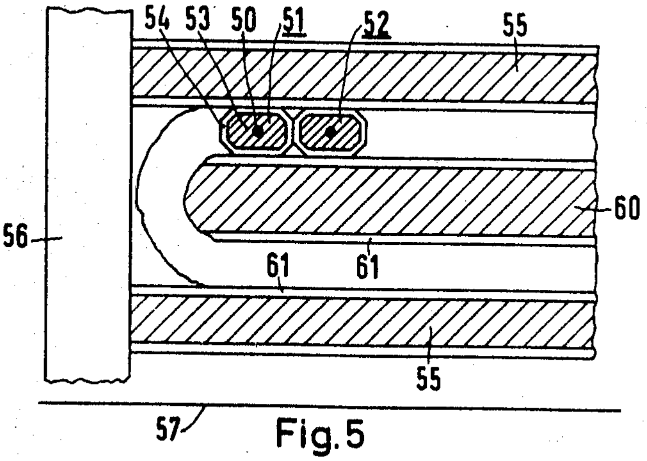
Figure 6A:
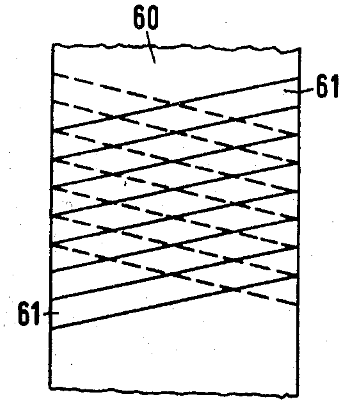
Figure 6B:
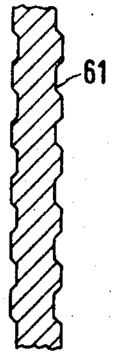

FIGS. 3*a* and 3*b* are diagrammatic views of the transition of the cores from one disc coil to the next according to FIG. 2, respectively with and without exchange or intertwist of the cores of the band;

FIG. 4*a* is a diagrammatic view of the construction of a band with superconductive cores disposed in the manner of a Roebel rod;

FIG. 4*b* is a sectional view taken along the line IV*b*—IV*b* in FIG. 4*a*;

FIG. 5 is a fragmentary sectional view of a coil constructed in accordance with the invention; and FIGS. 6*a* and 6*b* are top plan views and cross-sectional views respectively of the reinforcing band forming part of the coil construction of FIG. 5 showing the diagonal channels formed therein.

Referring now to the drawings, there is shown in FIG. 1 the midportion of a direct-current disc coil assembled from a plurality of component disc coils 11 to 17. As shown by the associated curved arrows, the even-numbered component coils receive current from the outside of the respective next-preceding odd-numbered component coils while the odd-numbered component coils receive current from the inside of the respective next-preceding even-numbered component coils. The winding direction is opposite in the even-numbered and odd-numbered groups, so that their magnetic potential is not cancelled but is amplified instead. The coil has a symmetry plane 18 and a coil axis 19 and the magnetic field to the left and right hand side of the plane of symmetry 18 are mirror images of one another. Each of the component coils 11 to 17 is formed of many turns or windings of which the two lowest or radially innermost are identified by the reference numerals 20 and 21 and the radially outermost by the reference numeral 23. Each turn contains mutually insulated cores that are disposed next to one another as indicated by the reference characters 1, 2, . . . *m*. The various. flux linkages of the cores taken over the entire coil are balanced because the position of the cores 1 to *m* is not reversed at the symmetry plane 18, but rather is the same throughout the entire coil. The flux linkage is therefore always of the same magnitude respectively for core 1 and core *m* on the one hand core 2 and core *m*–1 on the other hand, and so on.

FIG. 2 illustrates a direct current disc coil according to the invention with component double coils each having a double-disc winding. Parts shown in FIG. 2 that are the same as in FIG. 1 are identified by the same reference characters as in FIG. 1. Coils 11 to 17 in FIG. 2 may be considered as being component windings of double disc coils with one pair of coils belonging to each double disc coil. In the assembly of FIG. 2, the reversal in the position of the cores or their cross-over occurs, with repect to the coil field, not only at the middle of the coil at the symmetry plane 18, but also after each component double coil which is formed of a double-disc winding. The irregularities of the flux linkage or the balancing of these irregularities in the assembly of FIG. 2 corresponds to that of the assembly according to FIG. 1. The transition from one component double coil to the next at the outer and inner periphery of the coil is shown in FIG. 2 by the lines 24 and 25 and is schematically illustrated in FIGS. 3*a* and 3*b*. In FIG. 3*a* there is shown the case where the positions of the respective cores 1 to *m* are reversed for example between coils 13 and 14, as shown by lines 24 in FIG. 2.

FIG. 3*b* shows the case for the transition from coil 15 at the left-hand side of the symmetry plane 18 to coil 16 at the right-hand side thereof, corresponding to the lines 25 of FIG. 2, whereby the reversal occurs through the symmetrical or mirror image-like magnetic field for a non-reversed core sequence.

The layout according to FIGS. 2 and 3*a* and 3*b* affords the advantage that the voltage between each two cores respectively is reduced when there is a rapid application and removal of excitation. The terminal voltage U of the coil may reach a value in the order of many thousands of volts, especially when the magnetic energy is decoupled from outside resistances while the coil is in transition. When each component loop is kept insulated, the voltage between adjacent windings will still amount only to $U/n$, a small value because of the large number of turns $n$. The foregoing notwithstanding, the voltage between the cores, for example between the cores 1 and 2 in an assembly according to FIG. 1, in the middle of the entire coil, can be greater than the winding or turn voltage. This voltage between the cores is $U/a{\cdot}m$, wherein $a$ depends on the ratio of the radial field to the total field. When for example, $m$ is only $n/100$, the voltage between the component codnuctors or cores can be many times greater than that between the windings. This calls for a relatively strong insulation between the cores. For a large number $p$ of component coils of a device according to FIGS. 2 and 3, the voltage between the cores reduces to a value $U/amp$, so that a thin insulation suffices for the cores.

The voltage between the cores of a band is reduced to a minimum by intertwisting or crosswise interchanging the cores at a relatively short length of twist as for a kind of Roebel rod. For example, if each turn or winding has $q$ lengths of twist, the voltage between adjacent component conductors or cores drops to below $U/anmq$. This voltage is so low that as a rule a thin oxide layer is adequate to insulate the cores of the band.

A band constructed in the manner of a Roebel rod is schematically shown in FIGS. 4*a* and 4*b*. The superconducting cores 40 are disposed within the band in zig-zag fashion extending from one longitudinal edge of the band to the other, and are placed, for example, upon a carrier band 41 as illustrated in section in FIG. 4*b*. The section of FIG. 4*b* is taken along line IV*a*—IV*a* of FIG. 4*a* in the direction of the arrows. The carrier band 41 can be made of steel, for example.

A prefered embodiment according to the invention is produced when the band for a direct-current disc coil is constructed in the manner of a reinforced Roebel rod. The encasement of the individual wires made of superconducting material such as niobium-zirconium with a stabilizing metal is technologically simpler to produce and is less expensive than the embeddinv of a plurality of superconducting wires into a single wide copper or aluminum band, if a good connection between the superconductor and stabilizinp metal is valued. If such a subdivided stabilizing conductor is employed, hardly any more work is required to effect an intertwisting of the individual cores, namely in a flat conductor of the type of a Roebel rod. This affords the essential advantage of small excitation losses and of a stable field distribution with respect to time. The subdivision of the individual cores moreover permits an enlargement of the cooling surface to the coolant, such as helium, without having to enlarge the coolant volume to any appreciable degree. It is expedient in this connection to wind the individual cores around with a glass-fiber band. In this way, the flowing coolant can also penetrate between the adjacent cores and simultaneously forces can be transmitted in all directions, without difficulty.

The stabilizing conductor can be made of copper or aluminum, for example. Aluminum is preferable since it is cheap and can be easily pressed around the superconductor. It is then expedient to use as the reinforcing band, an aluminum alloy with high tensile strength and a high modulus of elasticity. This aluminum alloy should also have a thermal expansion which should not deviate too much from that of pure aluminum. When copper is used for the stabilizing purpose, it is advantageous to employ a nonmagnetic alloyed steel for example "Remanit," or titanium for reinforcement.

FIGS. 5 as well as 6*a* and 6*b* disclose the construction of a coil according to the invention with a band formed like a Roebel rod, In the illustrated embodiment, each band contains eighty superconducting cores 50 of niobium-zirconium 33 wire having a diameter of 0.25 mm. FIG. 5 shows two individual conductors 51 and 52 in section. The coil axis extends parallel to line 57. The cores 50 are surrounded by a copper jacket 53 of approximately 1 mm.$^2$ cross section. Each copper jacketed core has a cross section of about 0.7 mm. x 1.6 mm. formed with bevelled edges. It is wound at a pitch of about 5 mm. about a Remanit band 60 of about 1.2 mm. in thickness and approximately 2 mm. width, so that approximately 60% of the core surface remains uncovered by glass fibers. The cores are wound at a pitch of about 1 mm. about a Remanit band 60 of about 1.2 mm. in thickness. The Remanit band 60 which is illustrated in top plan view in FIGS. 6*a* and 6*b* in cross section, respectively has on both sides rolled-in, somewhat inclined cross-channels 61 of about 0.1 mm. depth and about 5 mm. width at approximately 5 mm. spacing from one another. During the winding process, similar and somewhat wider Remanit bands 55 can be inserted between two windings. The bands 55 have the function of absorbing the axial pressure of the cores and to transmit it. The disc coils, formed of a plurality of turns or windings according to FIG. 5, abut an approximately 2 mm. thick insulating crosspiece 56 leaving radial channels therebetween. The insulating crosspiece 56 transmits the axial pressure of the coils to the bands 55 and thereby relieve the cores from the total axial pressure of the component coils.

An important advantage of the coil of the present invention is that despite the mutual insulation of the cores of the band, no attention need be given to any significant change in the free surface of the band, i.e. to any impairment in the cooling possibilities of the band. If relatively high voltages, in the order of magnitude of several volts are to be anticipated between the cores of a band, it is of advantage to place insulators between the cores that are surrounded by stabilizing metal. The remaining surface of the stabilizing metal can then remain bare. If relatively low voltages in the order of magnitude of only several volts for a band of the Roebel rod type is to be expected between the individual cores, it should suffice as a rule only to oxidize on the outside the stabilizing material surrounding the cores. The oxide layer which then surrounds the stabilizing metal completely assumes the function of the insulator. Such an oxide layer would be completely adequate for insulating purposes, for example for the embodiment shown in FIG. 5. A glass-fiber band is used in the embodiment of FIG. 5 only to effect an even better cooling of the coil.

I claim:

1. Superconductive direct-current disc coil comprising at least two serially connected disc windings, each of said windings being formed of a winding band having a plurality of superconductive filamentary cores embedded therein and extending lengthwise of said band, said cores being spaced and insulated from one another and being connected in parallel at the ends of said band, respective pairs of said cores and the connections thereof forming a main loop, each of said main loops being intertwisted so as to be subdivided into component loops so that production of radial flux in said main loop is substantially avoided and peripheral voltages in said component loops substantially cancel one another during application and removal of excitation from the coil.

2. Superconductive direct-current disc coil according to claim 1 comprising a pair of coil halves disposed symmetrically on opposite sides of a plane extending radially to the coil, the superconducting cores of said band being insulated from one another at said plane and extending without intertwist from one of the coil halves to the other.

3. Superconductive direct-current disc coil according to claim 2 comprising a plurality of component double coils having a respective double disc-winding, the cores of the band in at least one part of each coil half being intertwisted between adjacent component double coils.

4. Superconductive direct-curent disc coil according to claim 1 wherein said band is in the form of a Roebel rod so that said intertwists of said cores periodically repeat within said band and continuously over the entire length of said band.

5. Superconductive direct-current disc coil according to claim 4 comprising reinforcing bands supporting said Roebel rod-like band, said reinforcing bands being adapted to absorb radial and axial forces occurring at said cores.

6. Superconductive direct-current disc coil according to claim 5 wherein said reinforcing bands are formed with channels for conveying coolant to said cores individually.

References Cited

UNITED STATES PATENTS

| | | | |
|---|---|---|---|
| 3,281,737 | 10/1966 | Swartz | 335—299 XR |
| 3,283,217 | 11/1966 | Cherry. | |
| 3,283,276 | 11/1966 | Hritzay | 335—216 |

GEORGE HARRIS, Primary Examiner

U.S. Cl. X.R.

335—299

PO-1050
(5/69)

UNITED STATES PATENT OFFICE
CERTIFICATE OF CORRECTION

Patent No. 3,531,744 Dated September 29, 1970

Inventor(s) Wilhelm Kafka

It is certified that error appears in the above-identified patent and that said Letters Patent are hereby corrected as shown below:

In the heading, page 1, column 1 - the German priority number should read --P 16 39 421.1--

SIGNED AND
SEALED
DEC 15 1970

(SEAL)
Attest:

Edward M. Fletcher, Jr.
Attesting Officer

WILLIAM E. SCHUYLER, JR.
Commissioner of Patents